(12) United States Patent
Kim et al.

(10) Patent No.: US 12,488,535 B2
(45) Date of Patent: Dec. 2, 2025

(54) PRE-PROCESSING METHOD FOR CREATING 3D VIRTUAL MODEL AND COMPUTING DEVICE THEREFOR

(71) Applicant: 3I INC., Daegu (KR)

(72) Inventors: Ken Kim, Seoul (KR); Ji Wuck Jung, Goyang-si (KR); Farkhod Rustam Ugli Khudayberganov, Seoul (KR); Mikhail Li, Paju-si (KR)

(73) Assignee: 3I INC., Daegu (KR)

( * ) Notice: Subject to any disclaimer, the term of this patent is extended or adjusted under 35 U.S.C. 154(b) by 117 days.

(21) Appl. No.: 18/517,583

(22) Filed: Nov. 22, 2023

(65) Prior Publication Data

US 2024/0221304 A1    Jul. 4, 2024

(30) Foreign Application Priority Data

Dec. 30, 2022  (KR) .................. 10-2022-0190107

(51) Int. Cl.
*G06T 5/77* (2024.01)
*G06T 3/073* (2024.01)
(Continued)

(52) U.S. Cl.
CPC ............. *G06T 17/00* (2013.01); *G06T 3/073* (2024.01); *G06T 5/60* (2024.01); *G06T 5/77* (2024.01); *G06V 10/56* (2022.01); *G06T 2207/10024* (2013.01); *G06T 2207/20084* (2013.01); *G06V 2201/07* (2022.01)

(58) Field of Classification Search
None
See application file for complete search history.

(56) References Cited

U.S. PATENT DOCUMENTS 10,096,122 B1 * 10/2018 Agrawal .................. G06T 7/90
10,290,085 B2     5/2019 Lin et al.
(Continued)

FOREIGN PATENT DOCUMENTS

KR      10-2061867 B1      1/2020

OTHER PUBLICATIONS

Jung, Minsuk et al., "Deep Learning Based Object Recognition in Spherical Panoramic Image," Journal of Korea Game Society, Oct. 2018, (p. 5-14).
(Continued)

*Primary Examiner* — Joni Hsu
(74) *Attorney, Agent, or Firm* — NSIP Law

(57) ABSTRACT

A hole-filling method, performable on a computing device, for providing a three-dimensional virtual model according to a technical aspect of the present application may comprises the operations of: acquiring an original training image and a hole creation training image, wherein the hole creation training image is an image in which at least one hole is created based on the original training image; creating a hole-filling training image by performing hole-filling on the hole creation training image using a neural network; performing spherical transformation on each of the hole-filling training image and the original training images; and training the neural network based on the difference between the spherically transformed hole-filling training image and the spherically transformed original training image.

11 Claims, 13 Drawing Sheets

(51) Int. Cl.
    *G06T 5/60*     (2024.01)
    *G06T 17/00*     (2006.01)
    *G06V 10/56*     (2022.01)

(56) References Cited

U.S. PATENT DOCUMENTS

| | | |
|---|---|---|
| 11,164,384 B2 | 11/2021 | Huang et al. |
| 11,727,587 B2 | 8/2023 | Pugh et al. |
| 2021/0199809 A1* | 7/2021 | Wynn .................... G03B 37/02 |

OTHER PUBLICATIONS

Bae, Kyoung-Ho, "Development of Detection and In-painting in 3D Object Texturing Occlusion Area for Digital Twin Construction," Journal of Korea Academia-Industrial Cooperation Society, vol. 23, No. 10, 2022, (p. 683-689).

* cited by examiner

PRE-PROCESSING METHOD FOR CREATING 3D VIRTUAL MODEL AND COMPUTING DEVICE THEREFOR

CROSS-REFERENCE TO RELATED APPLICATIONS

This application claims the benefit under 35 U.S.C. § 119(a) of Korean Patent Application No. 10-2022-0190107 filed on Dec. 30, 2022, in the Korean Intellectual Property Office, the entire disclosure of which is incorporated herein by reference for all purposes.

BACKGROUND

1. Field

This application relates to a pre-processing method for creating a three-dimensional (3D) virtual model and computing device therefor.

2. Description of Related Art

In recent years, virtual space implementation technology has been developed that allows users to experience as if they are in a real space without directly visiting the real space by providing an online virtual space that corresponds to the real space. This real space-based virtual technology is a technology for implementing a digital twin, and various developments of the technology have been being conducted.

In order to implement such a virtual space based on the real space, it is necessary to acquire an image by photographing the real space to be implemented, and based on the photographed image, create a stereoscopic virtual image, that is, a 3D virtual model to thereby provide the virtual space.

That is, this 3D virtual model is created based on data acquired by photographing several points within the real space. As an example, in order to construct a 3D virtual model, data acquired by 360-degree photographing at several points in the real space are collected, and a 3D virtual model can be created on the basis thereof.

However, when collecting data about this real space, there is a problem that unwanted objects are reflected. For example, when collecting data about the interior of a factory facility, if a person passing by, etc. are photographed, there occurs a problem in that the image and distance value of the person passing by are reflected in the 3D virtual model.

(Patent Document 0001) U.S. Pat. No. 10,290,085

SUMMARY

One technical aspect of the present invention is to solve the problems described above, and according to an embodiment disclosed in the present application, the purpose of the present invention is to provide pre-processing to remove noise related to non-photographing objects by identifying the non-photographing objects such as people, in the image data used to construct a 3D virtual model and deleting these non-photographing objects.

According to an embodiment disclosed in the present application, the purpose of the present invention is to more accurately fill noise data caused by the non-photographing objects by using a deep learning-based artificial intelligence model to fill holes occurred by deletion of non-photographing objects.

The problems to be solved in the present invention are not limited to those mentioned above, and other problems not mentioned herein will be clearly understood by those skilled in the art from the description below.

One technical aspect of the present invention proposes a pre-processing method for creating a three-dimensional (3D) virtual model. The pre-processing method, performable on a computing device for creating a 3D virtual model based on a plurality of data sets, each of which is created from a plurality of photographing points in an indoor space and includes image data, may comprise: determining whether an object to be deleted exists in the image data; if the object to be deleted exists in the image data, deleting data in an area corresponding to the object to be deleted from the image data; and filling a hole area created by deleting the data in the area corresponding to the object to be deleted using a neural network.

Other technical aspect of the present invention proposes a computing device. The computing device may comprise a memory for storing one or more instructions and at least one processor for executing the one or more instructions stored in the memory, wherein the one or more instructions cause, when executed by the at least one processor, the at least one processor to: prepare a plurality of data sets, each of which is created from a plurality of photographing points in an indoor space and includes image data; determine whether an object to be deleted exists in the image data; if the object to be deleted exists in the image data, deleting data in an area corresponding to the object to be deleted from the image data; and filling a hole area created by deleting the data in the area corresponding to the object to be deleted using a neural network.

Another technical aspect of the present invention proposes a storage medium. The storage medium is a storage medium that stores computer-readable instructions. The instructions, when executed by a computing device, cause the computing device to perform the operations of: acquiring an original training image and a hole creation training image, wherein the hole creation training image is an image in which at least one hole is created based on the original training image; creating a hole-filling training image by performing hole-filling on the hole creation training image using a neural network; performing spherical transformation on each of the hole-filling training image and the original training images; and training the neural network based on the difference between the spherically transformed hole-filling training image and the spherically transformed original training image. The computer-readable recording medium disclosed as a technical means for solving the technical problems described above may be that having a program stored therein for causing at least one of embodiments of the disclosed method to be executed on a computer.

The means for solving the above problems do not enumerate all the features of the present application. Various means for solving the problems of this application can be understood in more detail by referring to specific embodiments in the detailed description below.

According to the present application, there is one or more of the following effects.

According to an embodiment disclosed in the present application, there is an effect that is capable of providing hole-filling for the panoramic image itself used to construct a 3D virtual model.

According to an embodiment disclosed in the present application, there is an effect that is capable of removing noise about a non-photographing object by identifying the non-photographing object such as people in the image data used to construct a 3D virtual model and deleting the non-photographing object.

According to an embodiment disclosed in the present application, there is an effect that is capable of, even when unnecessary objects such as people are deleted in constructing a 3D virtual model of a real-existing indoor space, filling efficiently and accurately a hole resulting from the deletion.

The effects of the present application are not limited to those mentioned above, and other effects not mentioned will be clearly understood by those skilled in the art from the detailed description of the application.

DETAILED DESCRIPTION

Figure 1:
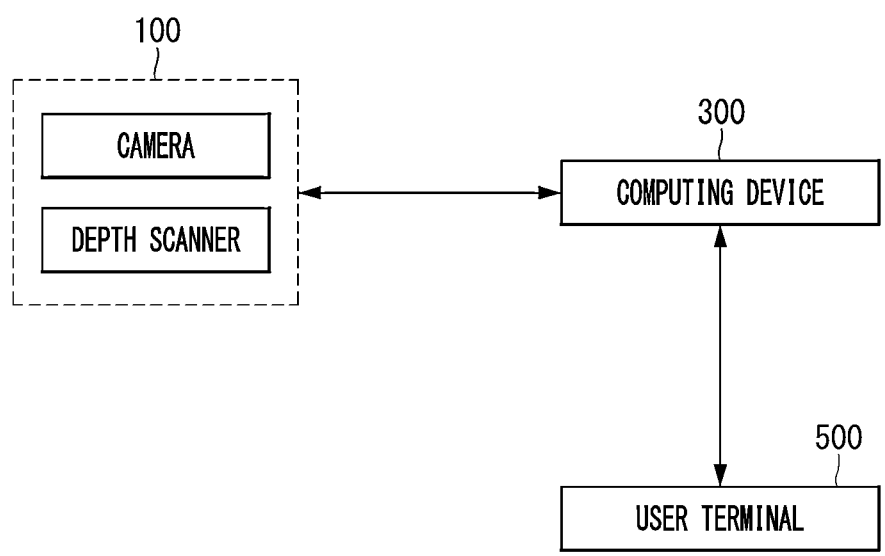
FIG. 1 is an example diagram for explaining a system that provides a hole-filling method for providing a 3D virtual model according to an embodiment disclosed in the present application.

Hereinafter, preferred embodiments of the present application will be described with reference to the attached drawings. However, these embodiments do not represent the entire technical spirit of the present invention, and should be understood to include various modifications, equivalents, and/or alternatives of the embodiments of the present disclosure.

In describing the present disclosure, if it is determined that a detailed description of related known functions or configurations may unnecessarily obscure the gist of the present disclosure, the detailed description thereof will be omitted.

The terms as used in this disclosure are merely used to describe specific embodiments and are not intended to limit the scope of the rights. Singular expressions include plural expressions unless the context clearly indicates otherwise.

In the present disclosure, expressions such as "have," "may have," "include," or "may include" refer to the presence of the corresponding features (e.g., components such as numerical value, function, operation or part) and does not rule out the existence of additional features.

In connection with the description of the drawings, similar reference numerals may be used for similar or related components.

The singular form of a noun corresponding to an item may include one or more of the above items, unless the relevant context clearly indicates otherwise. In this application, each of phrases such as "A or B", "at least one of A and B", "at least one of A or B", "A, B or C", "at least one of A, B and C" and "A, and "at least one of B, or C" may include any one of the items listed together in the corresponding phrase among the phrases or any possible combination thereof.

Terms such as "first" and "second" may be used simply to distinguish one element from another element and limit corresponding elements in other aspects (e.g. importance or order).

When one (e.g., first) element is referred to as "coupled" or "connected" to another (e.g., second) element, with or without the terms "functionally" or "communicatively," it means that any component can be connected to the other component directly or through a third component.

The expression "configured to (or set to)" as used in the present disclosure can be used interchangeably with, for example, "suitable for," "having the capacity to," "designed to," "adapted to," "made to," or "capable of" depending on the situation. The expression "configured (or set to)" may not necessarily mean just "specifically designed to" in hardware.

Instead, in some contexts, the expression "a device configured to" may mean that the device is "capable of" working with other devices or components. For example, the phrase "processor configured (or set) to perform "A, B and C" may mean a processor (e.g., an embedded processor) dedicated to performing the corresponding operations or a general-purpose processor (e.g., CPU or application processor) capable of performing the corresponding operations by executing one or more software programs stored on a memory device.

In an embodiment, a 'module' or 'unit' performs at least one function or operation, and may be implemented as hardware or software, or as a combination of hardware and software.

Also, a plurality of 'modules' or a plurality of 'units' may be integrated into at least one module and implemented with at least one processor, except for 'module' or 'unit' that needs to be implemented with specific hardware.

Various embodiments of the present application may be implemented with a software (e.g., program) including one or more instructions stored in a storage medium that can be read by a machine (e.g., user terminal 500 or computing device 300). For example, it may be implemented as a program). For example, the processor 303 may call at least one instruction among one or more instructions stored from a storage medium and execute it. This allows the device to be operated to perform at least one function according to the at least one instruction called. The one or more instructions may include codes created by a compiler or codes that can be executed by an interpreter. A storage medium that can be read by a machine may be provided in the form of a non-transitory storage medium. Here, the term 'non-transitory' only means that the storage medium is a tangible device and does not contain signals (e.g., electromagnetic waves), and this term does not distinguish the case that the data is semi-permanently stored in the storage medium and the case that the data is temporarily stored in the storage medium.

Various flowcharts are disclosed to explain the embodiments of the present application, but these are for convenience of explanation of each step or operation, and each step is not necessarily performed according to the order of the flowchart.

That is, each step in the flowchart may be performed simultaneously, in an order according to the flowchart, or in an order opposite to the order in the flowchart.

FIG. 1 is an example diagram for explaining a system for creating a 3D virtual model according to an embodiment disclosed in the present application.

Referring to FIG. 1, the system may include an image acquisition device 100, a computing device 300, and a user terminal 500.

The image acquisition device 100 can create color image data and depth map data used to create a 3D virtual model. Hereinafter, the color image data is abbreviated as image data.

In one embodiment, the image acquisition device 100 may create image data used to create a three-dimensional virtual model. The computing device 300 may create depth map data based on such color image data.

In the illustrated example, the image acquisition device 100 may include a depth scanner that performs distance measurement to create depth map data, and a camera that creates image data.

The camera is a device that provides a photographing function and creates image data expressed in color for the subject area (imaging area).

In the specification of this application, the color image encompasses all images expressed in color, and is not limited to a specific expression scheme. Therefore, color images can be applied in various standards, such as RGB images expressed in red, green and blue (RGB) as well as CMYK images expressed in cyan, magenta, yellow and key (CMYK).

As an example, mobile phones, smart phones, laptop computers, personal digital assistants (PDAs), tablet PCs, ultrabooks, wearable devices, for example, a glass-type terminal (smart glass), etc. may be used as the camera A depth scanner is a device that can create depth map data by creating depth information about the subject area.

In the specification of the present application, depth map data is data containing depth information with respect to the subject space. For example, each pixel included in the depth map data may be distance information to each point (a point corresponding to each pixel) in the subject space that was photographed at the imaging point.

The depth scanner may include a predetermined sensor for measuring distance, such as a LiDAR sensor, an infrared sensor and an ultrasonic sensor. Alternatively, the depth scanner may include a stereo camera, a stereoscopic camera, a 3D depth camera, etc. that can measure distance information by replacing the sensor.

The camera creates image date and the depth scanner creates a depth map image. The image data created by the camera and the depth map image created by the depth scanner can be created under the same conditions (e.g., resolution, etc.) for the same subject area, and as a result, they can be matched 1:1 with each other.

The depth scanner and camera can create a 360-degree panoramic image form, that is, a 360-degree depth map panoramic image and a 360-degree color panoramic image, respectively, for an real indoor space, and provide them to the computing device 300.

The depth scanner can create distance information of each of several indoor points where such 360-degree photographing has been performed. This distance information may be relative distance information on the basis of the photographing point. For example, the depth scanner may have a floor plan of an indoor space and receive input of a first starting indoor point within the floor plan according to a user's input. Thereafter, the depth scanner may create relative distance movement information based on image analysis and/or movement detection sensor (for example, 3-axis acceleration sensor and/or gyro sensor). For example, the depth scanner may create information about a second indoor point based on relative distance movement information from the starting indoor point and create information about a third indoor point based on relative distance movement information from the second indoor point. The creation of such distance information may be performed by a camera.

In one embodiment, the depth scanner and camera can be implemented as a single image acquisition device. For example, the image acquisition device 100 may be a smartphone that includes a camera for image acquisition and a LiDAR sensor for distance measurement.

The depth scanner or camera may store information about the photographing height and provide the information to the computing device 300. This photographing height information can be used to create a 3D virtual model in the computing device 300.

Depth map data and image data may be 360-degree panoramic images that cover areas corresponding to each other. These depth map data and image data may be panoramic images of a suitable form, for example, an equirectangular projection panoramic image, to provide a 360-degree image.

The user terminal 500 is an electronic device that allows a user to access the computing device 300 and experience a virtual 3D model corresponding to an indoor space, and may include, for example, a mobile phone, a smart phone, a laptop computer, digital broadcasting terminal, a personal digital assistants (PDA), a portable multimedia player (PMP), navigation, a personal computer (PC), a tablet PC, an ultrabook, and a wearable device such as a watch-type terminal (smartwatch), a glass-type terminal (smart glass) and a head mounted indicate (HMD). However, besides that, the user terminal 500 may include electronic devices used for a virtual reality (VR) and an augmented reality (AR).

The computing device 300 is a computing device for providing services based on a 3D virtual model. The computing device 300 may be a server or a user terminal such as a smart phone and tablet PC. In other words, any computing device that performs a pre-processing for creating a 3D virtual model according to the present disclosure can be applied as the computing device of the present disclosure regardless of its type.

The computing device 300 may create a 3D virtual model, which is a 3D virtual space corresponding to the indoor space, using image data and depth map data created at several indoor points, respectively.

The computing device 300 is a virtual space corresponding to a real space and can create a 3D model based on image data and depth images created at a plurality of indoor photographing points. The 3D model is a virtual model into which depth information has been reflected and can provide a 3D space equivalent to the real space.

As a function for creating such a 3D virtual model, the computing device 300 can identify and delete objects (hereinafter referred to as objects to be deleted) that are unnecessary for creating a virtual model from image data. When data in an area corresponding to the object to be deleted is deleted from image data, a hole area is created. The computing device 300 can fill these hole areas using a deep learning learned neural network, and hereinafter, filling these hole areas is referred to as hole filling. That is, as a pre-processing process for creating a 3D virtual model, the computing device 300 allows to identify and delete an object to be deleted from image data, and perform hole-filling on the resulting hole area using the neural network. Through this, it is possible to prevent unnecessary objects (for example, a person passing by) from being reflected in the 3D virtual world, and more accurate data restoration is possible by performing hole-filling using a learned neural network.

In one embodiment, the computing device 300 may equally perform the process of deleting the object to be deleted and hole-filling with respect to the depth map data corresponding to the image data as well.

In another embodiment, the computing device 300 may perform a pre-processing on image data by deleting the object to be deleted and hole filling, and create depth map data based on the pre-processed image data.

The computing device 300 may create a 3D virtual model based on the pre-processed data.

As an example, the computing device 300 can create a plurality of point clouds in 3-dimensions based on a plurality of data sets, each of which corresponding to a plurality of photographing points in an indoor space and including image data, depth map data and location information of each point, and create a 3D mesh model by arranging these point clouds in a 3-dimensional space. The 3D mesh model may be a mesh model created by setting a plurality of faces based on a plurality of vertices selected based on the point clouds. For example, one face can be created based on three adjacent vertices, and each face can be a planar triangle set with three vertices. Once each face is determined in the 3D mesh model, the computing device 300 may set the color value of each face based on image data associated with each face. Image data associated with the face may be set based on a direction vector perpendicular to the face. The computing device 300 can select one image data to set the color value of each face, and to this end, produce a plurality of weight factors for each image data and then calculate the weight based on them. The computing device 300 may select any one image data based on the weight.

Hereinafter, with reference to FIGS. 2 to 15, the pre-processing method performed by the computing device 300 will be described in more detail.

Figure 2:
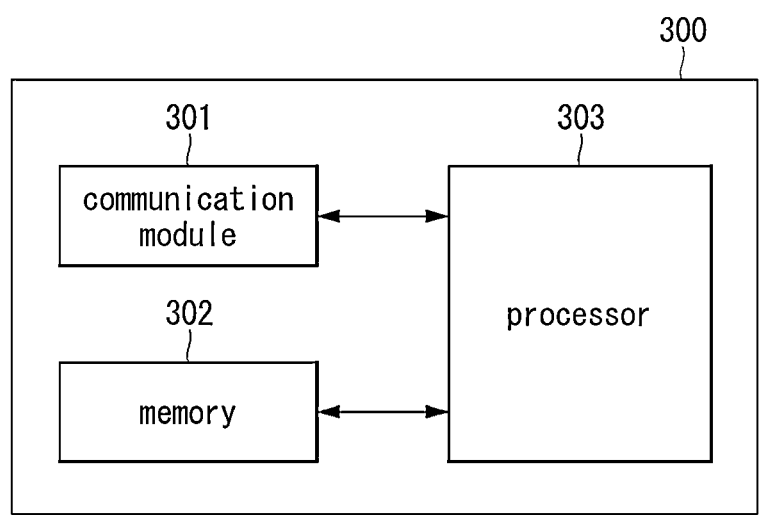
FIG. 2 is a block diagram illustrating a computing device according to an embodiment disclosed in the present application.

FIG. 2 is a block diagram illustrating a computing device according to an embodiment disclosed in the present application. As shown in FIG. 2, the computing device 300 according to an embodiment of the present disclosure may include a communication unit 301, a memory 302 and a processor 303. However, this configuration is an example, and of course, in carrying out the present disclosure, new configurations may be added in addition to these configurations or some configurations may be omitted.

The communication unit 301 includes a circuit and can perform communications with external devices (including user terminals). Specifically, the processor 303 can receive various data or information from an external device connected through the communication unit 301, and can also transmit the various data or information to the external device.

The communication unit 301 may include may include at least one of a WiFi module, a Bluetooth module, a wireless communication module and an NFC module, and perform communications according to various communication standards such as IEEE, Zigbee, 3G (3rd Creation), 3GPP (3rd Creation Partnership Project), LTE (Long Term) and 5G (5th Creation).

At least one instructions related to the electronic device 300 may be stored in the memory 320. An operating system (O/S) for driving the computing device 300 may be stored in the memory 302. Also, the memory 302 may store various software programs or applications for operating the electronic device 300 according to various embodiments of the present disclosure. Additionally, the memory 302 may include a semiconductor memory such as flash memory or a magnetic storage medium such as a hard disk.

Specifically, the memory 302 may store various software modules for operating the computing device 300 according to various embodiments of the present disclosure, and the processor 303 may control the operation of the computing device 300 by executing various software modules stored in the memory 302. That is, the memory 302 is accessed by the processor 303, and data read/write/modify/delete/update, etc. may be performed by the processor 303.

In various embodiments according to the present disclosure, a neural network model according to the present disclosure may be stored in the memory 302.

In addition, various information necessary within the scope of achieving the purpose of the present disclosure may be stored in the memory 302, and the information stored in the memory 302 may be updated as it is received from an external device or inputted by the user.

The processor 303 controls the overall operations of the computing device 300. Specifically, the processor 303 is connected to the configuration of the computing device 300 including the communication unit 301 and the memory 302 as described above, and control the overall operations of the computing device 300 by executing at least one instructions stored in the memory 302 as described above.

Processor 303 may be implemented in various ways. For example, the processor 303 may be implemented as at least one of an application specific integrated circuit (ASIC), an embedded processor, a microprocessor, hardware control logic, a hardware finite state machine (FSM) and a digital signal processor (DSP). Meanwhile, the term processor as used in the present disclosure may include a central processing unit (CPU), a graphics processing unit (GPU) and a main processing unit (MPU).

Various embodiments according to the present disclosure based on control of the processor 303 will be described later with reference to FIGS. 3 to 15.

Functions related to the neural network according to the present disclosure are operated through the processor 303 and memory 302. The processor 130 may be comprised of one or multiple processors 303. At this time, the one or more processors 303 may be a general-purpose processor such as a CPU, AP, or DSP (Digital Signal Processor), a graphics-specific processor such as a GPU or a VPU (Vision Processing Unit), or an artificial intelligence-specific processor such as an NPU. One or more processors 303 control input data to be processed according to predefined operation rules or a neural network model stored in the memory 302. Alternatively, when one or more processors 303 are dedicated artificial intelligence processors, the artificial intelligence dedicated processors may be designed with a hardware structure specialized for processing a specific neural network model.

The predefined operation rule or neural network model is characterized in that it is created through learning. Here, being made through learning means that a basic neural network model is learned using a plurality of training data by a learning algorithm, so that a predefined operation rule or neural network model set to perform a desired characteristic (or purpose) is created. Such learning may be performed in a device itself on which artificial intelligence according to the present disclosure is performed, or may be performed through a separate server and/or system. Examples of learning algorithms include supervised learning, unsupervised learning, semi-supervised learning, or reinforcement learning. However, embodiments are not limited to the above-described example.

The neural network model may be composed of a plurality of neural network layers. Each of the plurality of neural network layers may have a plurality of weight values, and a neural network operation may be performed through an operation between an operation result of a previous layer and a plurality of weight values. The plurality of weight values of the plurality of neural network layers may be optimized by the learning result of the neural network model. For example, a plurality of weight values may be updated so that a loss value or a cost value obtained from the neural network model during a learning process may be reduced or minimized. The neural network may include a Deep Neural Network (DNN), for example, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), or Deep Q-Networks, etc. However, embodiments are not limited to the above-described example.

Figure 3:
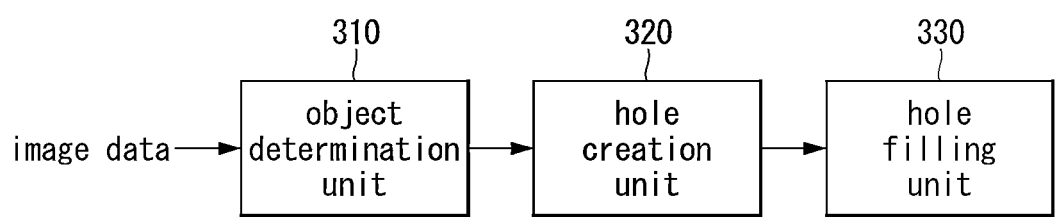
FIG. 3 is a diagram explaining the configuration of a computing device according to an embodiment disclosed in the present application.

FIG. 3 is a diagram explaining the configuration of a computing device according to an embodiment disclosed in the present application. Each part shown in FIG. 3 corresponds to a function implemented by the processor 303, which may be implemented as software, but is not limited thereto. Hereinafter, each part is described as a performer of a function, but the processor 303 may also be described as a performer.

Figure 4:
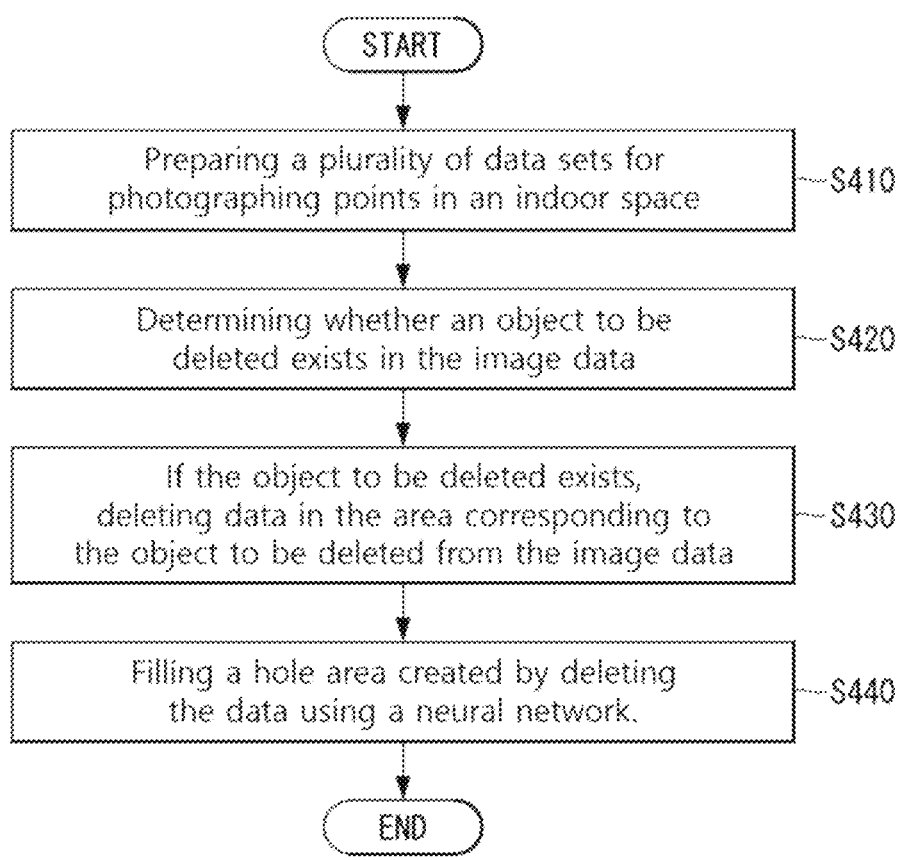
FIG. 4 is a flowchart explaining a pre-processing process for creating a 3D virtual model according to an embodiment disclosed in the present application.

FIG. 4 is a flowchart explaining a pre-processing process for creating a 3D virtual model according to an embodiment disclosed in the present application.

With reference to FIGS. 3 and 4, a pre-processing process for creating a 3D virtual model according to an embodiment disclosed in this application will be described.

A plurality of data sets corresponding to a plurality of photographing points in the indoor space are prepared. For example, the plurality of data sets may include image data captured at a plurality of photographing points in an indoor space by the image acquisition device 100 (S410).

In one embodiment, the image data may be panoramic image data including a 360-degree color image for any one of a plurality of photographing points, and is transformed into a sphere or cube to thereby allow the user to indicate images in a 360-degree omnidirection at each photographing point. As one example, the image data may be a panoramic image of an equirectangular projection scheme, but is not limited thereto.

The object determination unit 310 receives image data and determines whether an object to be deleted exists in the image data (S420). As an example, the object determination unit 310 may identify objects existing in image data using a neural network.

The object to be deleted is an object that is not necessary for creating a 3D virtual model of an indoor space, and may be, for example, a human object, but is not limited thereto.

Figure 11:
FIGS. 11 to 13 are diagrams illustrating object deletion and hole-filling processes according to an embodiment disclosed in the present application.

If the object to be deleted exists in the image data, the object determination unit 310 creates information about the object to be deleted and provides it to the hole creation unit 320. FIG. 11 shows this example and illustrates that a standing human object H0 has been identified in the image.

Figure 12:

The hole creation unit 320 deletes data in the area corresponding to the object to be deleted from the image data (S430). FIG. 12 shows this example and illustrates that the area corresponding to the standing human object H0 in the image has been deleted. Hereinafter, the area created by deleting the data of the area corresponding to the object to be deleted from the image data is referred to as a 'hole area'.

As an example, the hole creation unit 320 may receive information about the object to be deleted from the object determination unit 310, identify the area of the object to be deleted, and delete data in the corresponding area.

As an example, the hole creation unit 320 may set the pixel value of the area corresponding to the object to be deleted to a specific value (or null value) rather than a color value.

Figure 13:

The hole-filling unit 330 can fill the hole area with color data using a neural network (S440). FIG. 13 shows this example and illustrates an example of filling a hole area based on a training image. Hereinafter, filling color data using a neural network is referred to as 'hole filling'.

Figure 5:
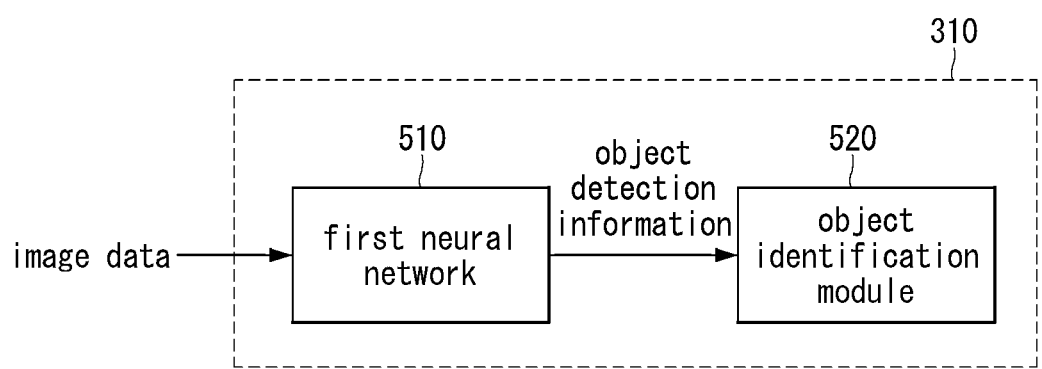
FIG. 5 is a diagram illustrating an object determination process according to an embodiment disclosed in the present application.

FIG. 5 is a diagram explaining an object determination process according to an embodiment disclosed in the present application, and illustrates an embodiment of the object determination unit 310.

The object determination unit 310 may detect at least one object existing in image data using the first neural network 510 that identifies the object.

The first neural network 510 is a deep-learned neural network to detect objects existing in an image, and can detect at least one object existing in image data.

As an example, the first neural network 510 may use an activation function when performing a learning process and an inference process, but is not limited thereto. Specifically, the activation function may play a role for determining whether the input values transmitted from previous layers will be passed to the next layers, and if so, for determining whether to transform them into which output values and pass them on, and the gradient of the activation function can be used to update the weights (parameters) of each layers.

The first neural network 510 can create detection information about all detected objects (for example, the detection information includes the center point location of the object, the width information of the object, and the height information of the object) and provide it to the object identification module 520.

The object identification module 520 has information about the object to be deleted and can determine whether the identified object is the object to be deleted.

As an example, classification information about the object identified as detection information may be included. That is, the first neural network 510 can create classification information (for example, type of person, type of facility, type of sign, etc.) about what type the detected objects are, and the object identification module 520 can confirm the object (for example, human objects) to be deleted among the detected objects, and identify the object to be deleted among the detected objects. The object identification module 520 can provide information about the object to be deleted to the hole creation unit 320.

In one embodiment, the first neural network 510 is learned using 360-degree color panoramic images as a training image, and can identify objects based on the panoramic image itself. In the case of the panoramic image, depending on its projection ways, even the same object may be set to have a different shape depending on its location in the image. Therefore, a plurality of sets of panoramic training images in which the same object (for example, a human object) exists at different positions in the image are prepared, and the first neural network 510 can be learned based on these plurality of panoramic training image sets. The learning method for this will be described later with reference to FIG. 9.

Figure 6:
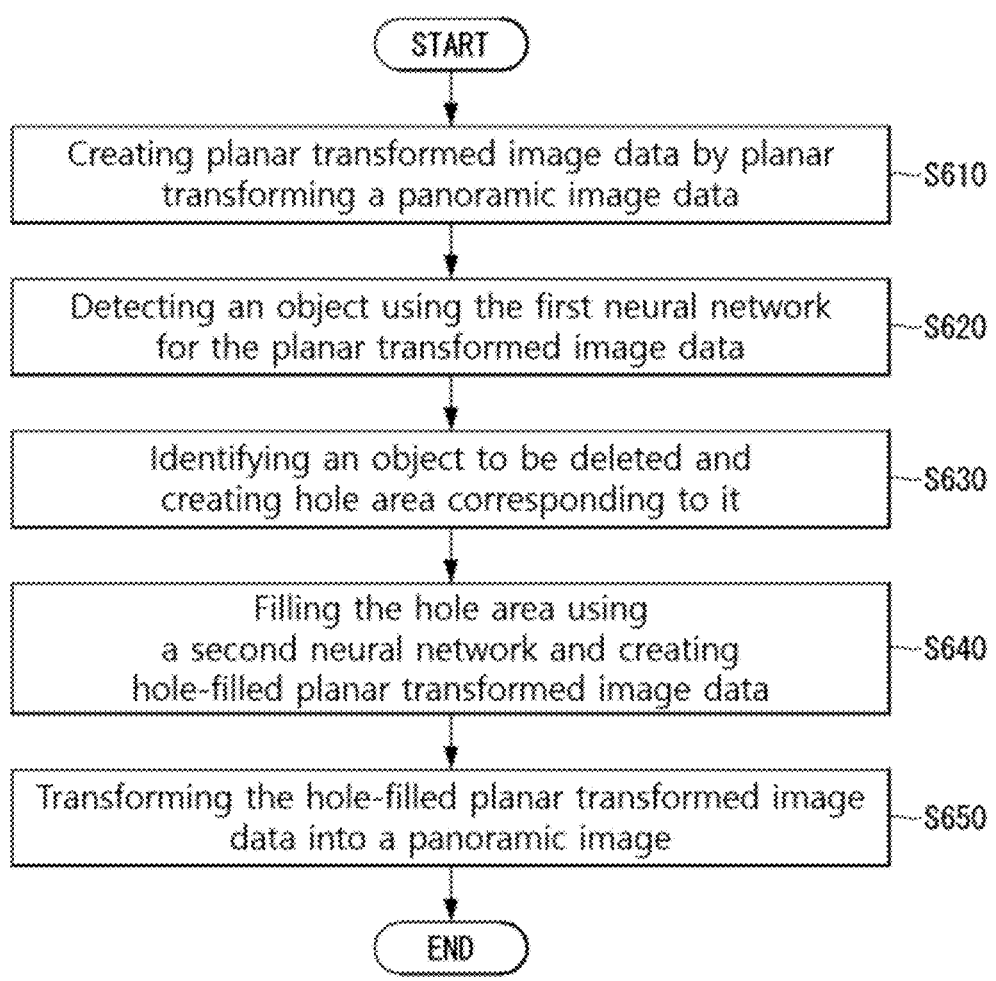
FIG. 6 is a flowchart explaining a pre-processing process for creating a 3D virtual model according to an embodiment disclosed in the present application.

In another embodiment, the first and second neural networks are learned based on planar image, and can go through the process of planar transforming the panoramic image before the input of the neural network, and inversely transforming the panoramic image back to the panoramic image after the output of the neural network. FIG. 6 illustrates such embodiment, which will be described with reference to FIG. 6. Referring to FIG. 6, the processor 303 can create planar-transformed image data by planar-transforming the panoramic image data (S610), and detect an object using the first neural network for the planar-transformed image data (S620). The processor 303 can identify an object to be deleted among the detected objects and delete the color data of the corresponding area to create a hole area (S630). The processor 303 can perform filling the hole area using a second neural network, create hole-filled planar-transformed image data (S640), and inversely transform it into a panoramic image (S650). In this embodiment, it is advantageous in that it can be applied even if the first neural network and the second neural network are learned based on a planar image.

Figure 7:
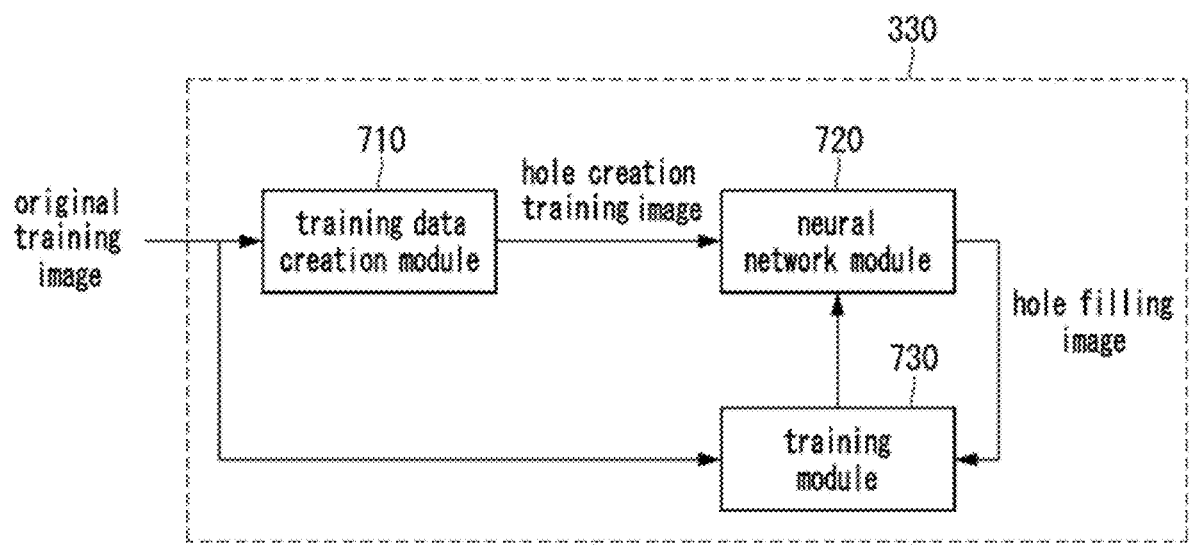
FIG. 7 is a diagram illustrating a hole-filling process according to an embodiment disclosed in the present application.

FIG. 7 is a diagram illustrating a hole-filling process according to an embodiment disclosed in the present application. Referring to FIG. 7, the learning structure of the second neural network module for hole-filling is explained.

Referring to FIG. 7, the hole-filling unit 330 may include a second neural network module 720, and may further include a training data creation module 710 for learning the second neural network module 720 and a training module 730.

As an example, the second neural network module 720 may also use an activation function when performing a learning process and an inference process. The activation function may play a role for determining whether the input values transmitted from previous layers will be passed to the next layers, and if so, for determining whether to transform them into which output values and pass them on, and the gradient of the activation function can be used to update the weights (parameters) of each layers included in the second neural network module 720.

The training module 730 is a module that acquires evaluation information related to the learning performance of the second neural network module 720.

For example, the training module 730 may obtain information about how many epochs the learning of the second neural network module 720 progressed, that is, how many times the entire training data was learned. Also, the training module 730 may obtain information about loss during the learning process.

The training data creation module 710 is a module that creates training data for performing hole-filling learning. The training data creation module 710 may receive an original training image and create a random hole in the original training image.

FIG. 7 illustrates the training process, and the training data creation module 710 can receive an original training image and create a random hole in the original training image to thereby create a hole creation training image.

In one embodiment, the training data creation module 710 can receive a plurality of information about the form of the object to be deleted and create a hole by reflecting the form of the object to be deleted. As an example, when the object to be deleted is a human object, the training data creation module 710 has silhouette information about various human movements and can use this to create a hole.

The training data creation module 710 can provide the created hole creation training image to the second neural network module 720, and the second neural network module 720 can provide learned content for the input hole creation training image. Based on this, a hole-filling processing can be performed to create a hole-filling image. The training module 730 compares the hole-filling image created by the second neural network module 720 with the original training image and changes the weight of the second neural network module 720 according to the difference between the two images and thus can train the second neural network module 720.

In this example, since the second neural network module 720 have no learned content in the first operation, the second neural network module 720 may create a hole-filling training image based on a random value at each node of the neural network. The second neural network module 720 may improve the accuracy of hole-filling process by repeatedly performing feedback training based on the difference between the hole-filling training image and the original training image.

Meanwhile, although hole-filling has been described above for color image data, hole-filling can equally be applied to the depth map data. In this case, the second neural network module that performs hole-filling on color image data and the second neural network module that performs hole-filling on depth map data may be individually implemented and individually learned, respectively. Since the values at which hole-filling must be performed are different depending on the type of input image, a second neural network module can be provided and trained, respectively for each type of input image.

Figure 8:
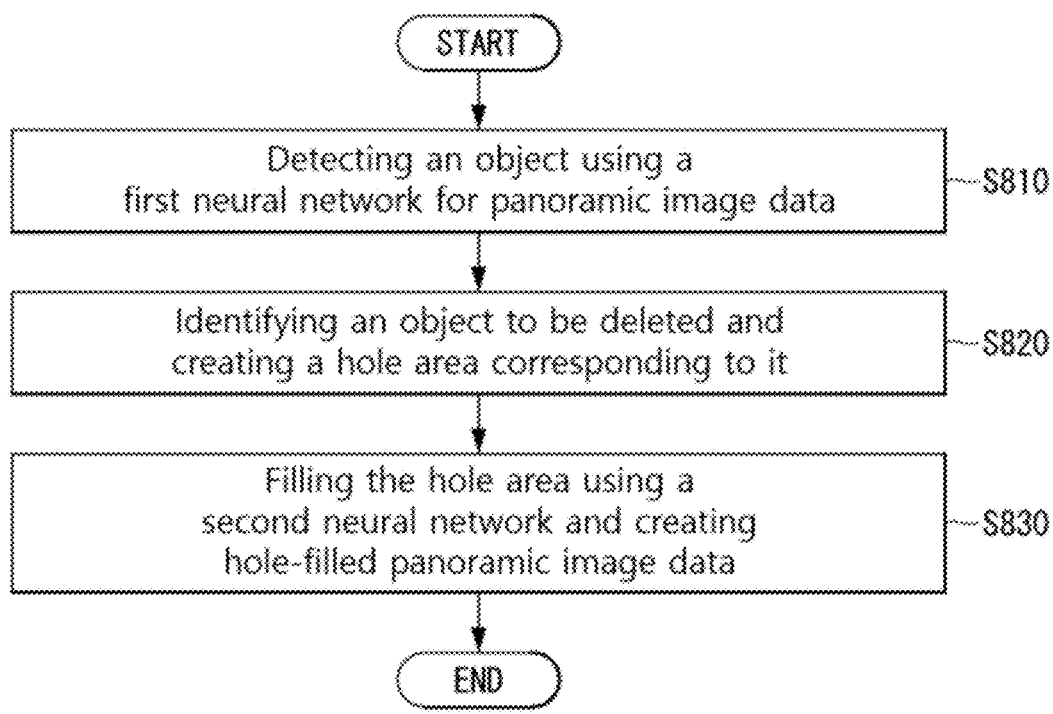
FIG. 8 is a flowchart explaining a hole-filling process according to an embodiment disclosed in the present application.

In one embodiment, the first neural network and the second neural network may be learned using panoramic images. For example, the image data shown in FIG. 3 and the original training image and the hole creation training image shown in FIG. 7, which are subject of object determination may be panoramic image data including a 360-degree color image. This embodiment is disclosed in FIG. 8. Referring to FIG. 8, the processor 303 may detect an object using a first neural network for panoramic image data (S810). The processor 303 can identify an object to be deleted in the panoramic image data and remove its color data to create a hole area (S820), and fill the hole area using a second neural network, so that the hole-filled panoramic image data can be created (S830). In this embodiment, panoramic images are also used as training data for the first neural network and the second neural network.

In one embodiment, when the first neural network and the second neural network are learned on panoramic images, the spherical transformation process may be reflected when calculating loss in the training module 730. That is, after spherically transforming the input original training image and the hole-filling image output from the second neural network module 720, respectively, the training module 730 may train the second neural network based on the loss between the spherically-transformed original training image and the spherically-transformed hole-filling image. Panorimic images are a form to be used in spherical transformation (or cube transformation), because the shape of the same object is set differently depending on each location. That is, since the panoramic image is used after being spherically transformed, the quality of the neural network that uses the panoramic image as an input and output can be improved by training the neural network based on the results in the spherical transformation state.

Also, it is possible to create training data based on the characteristics of the panoramic image, which will be described with reference to FIGS. 9 and 10.

Figure 9:
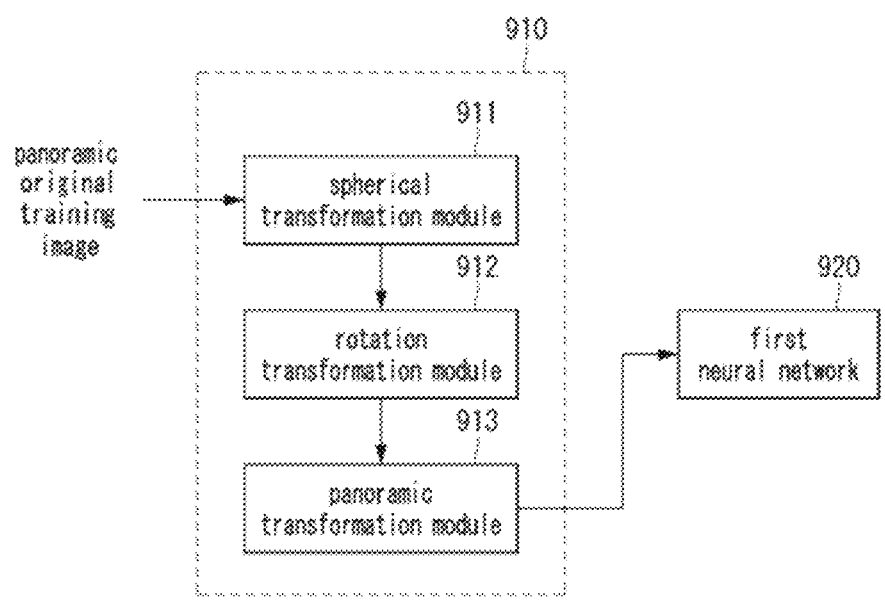
FIG. 9 is a diagram illustrating a learning method of a neural network using a panoramic image as an input target according to embodiments disclosed in the present application.
Figure 10:
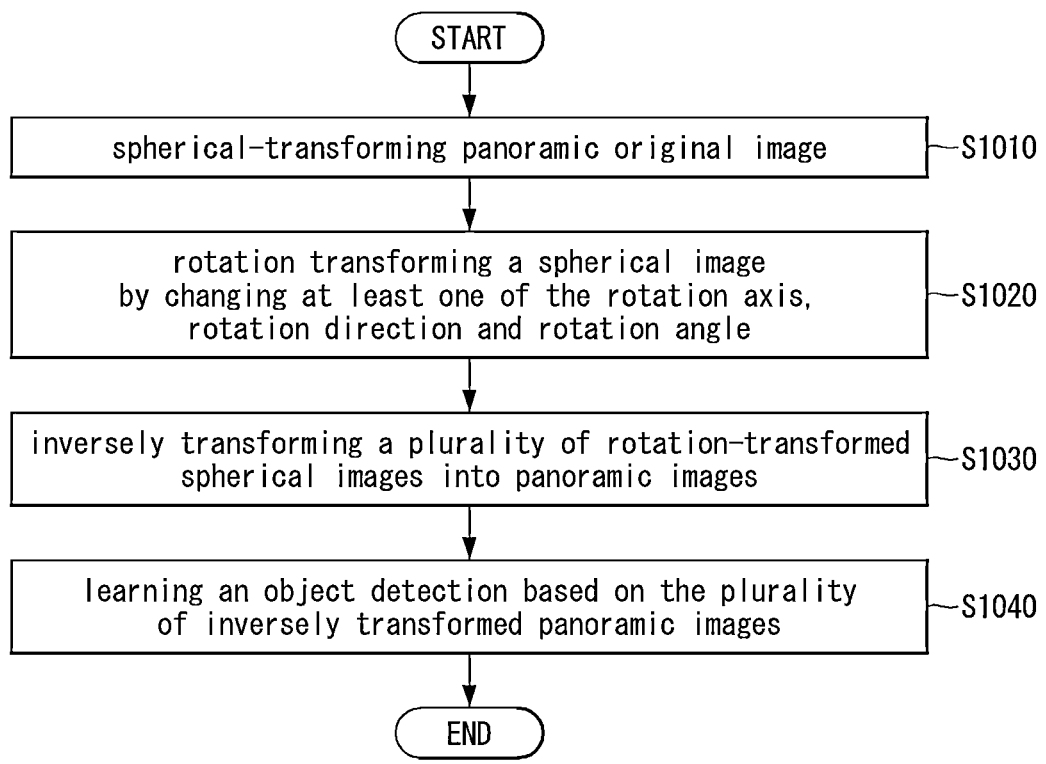
FIG. 10 is a flowchart explaining a learning method of the neural network shown in FIG. 9.

FIG. 9 is a diagram illustrating a learning method of a neural network using a panoramic image as an input according to embodiments disclosed in the present application, and FIG. 10 is a flowchart explaining a learning method of the neural network shown in FIG. 9.

The example shown in FIG. 9 includes a training data creation unit 910 and a first neural network 920 that learns based on the training data creation 910. The neural network to be learned can also be applied by changing to a second neural network.

The training data creation unit 910 can create a plurality of panoramic training images using one panoramic original training image. The spherical transformation module 911 can receive one panoramic original training image and perform spherical transformation on it (S1010).

As an example, the spherical transformation module 910 may perform spherical transformation using Equation 1 below, but is not limited thereto.

$$[\psi \star f](R) = \langle L_R \psi, f \rangle = \int_{S^2} \sum_{k=1}^{K} \psi_k(R^{-1}x) f_k(x) dx.$$
[Equation 1]

The rotation transformation module 912 can rotate the transformed spherical image by changing the rotation settings. For example, the rotation transformation module 912 may perform rotation transformation on a spherical image by changing at least one of the rotation axis, rotation direction, and rotation angle (S1020).

The panoramic transformation module 913 can inversely transform a plurality of rotationally transformed spherical images into panoramic images and provide them as training images for the neural network (S1030, S1040).

The first neural network 920 performs learning to identify an object (for example, a human object) to be deleted, and when spherical transformation is performed and then inversely transformed to a panoramic image, the shape of a human object in a panoramic image is many differently expressed with respect to the same human object and this is because the expansion ratio is different for each location during panoramic projection. Through this, a large number of training data can be created by spherically transforming one image and then variously rotating it, and various projection appearances of one object can be covered and thus the detection function of the first neural network can be improved.

This learning method is also applicable to the second neural network.

Meanwhile, the control method performed in the computing device 300 according to the above-described embodiment may be implemented as a program and provided to the computing device 300. In particular, a program including a control method of the computing device 300 may be stored in a non-transitory computer readable medium.

In the above, a control method of the computing device 300 and the computer-readable recording medium including the program for executing the control method of the computing device #00 have been briefly described in order to avoid redundant description. Of course, various embodiments of an electronic device 100 can also be applied to the control method of the computing device 300 and a computer-readable recording medium including a program that executes the control method of the computing device 300.

Meanwhile, a storage medium that can be read by a machine may be provided in the form of a non-transitory storage medium.

Here, 'non-transitory storage medium' simply means that it is a tangible device and does not contain signals (e.g. electromagnetic waves). This term does not distinguish between a case where data is semi-permanently stored in a storage medium and a case where data is temporarily stored in the storage media. For example, a 'non-transitory storage medium' may include a buffer where data is temporarily stored.

The present invention described above is not limited by the above-described embodiments and the accompanying drawings, but is limited by the scope of the claims described later. A person skilled in the art will easily appreciate that the configuration of the present invention can be varied and modified in a variety of ways within the scope without departing from the technical spirit of the present invention.

What is claimed is:

1. A pre-processing method, performable on a computing device, for creating a 3D virtual model based on a plurality of data sets, each of which is created from a plurality of photographing points in an indoor space and includes image data, comprising:
   determining whether an object to be deleted exists in the image data;
   if the object to be deleted exists in the image data, deleting data in an area corresponding to the object to be deleted from the image data; and
   filling a hole area created by deleting the data in the area corresponding to the object to be deleted using a neural network,
   wherein the image data is panoramic image data including 360-degree image for any one of the plurality of photographing points,
   wherein the determining whether an object to be deleted exists in the image data comprises:
      detecting at least one object existing in the image data using a first neural network that identifies an object; and
      identifying whether the at least one object is the object to be deleted, and
   wherein the detecting at least one object existing in the image data using the first neural network comprises:
      creating at least one planar transformed image data by planar transforming a panoramic image data; and
      detecting at least one object existing in the at least one planar transformed image data using the first neural network learned based on the at least one planar transformed image data.

2. The method according to claim 1, wherein the first neural network is learned using color panoramic images as a training data, and identifies an object based on a panoramic image itself.

3. The method according to claim 1, wherein the filling a hole area created by deleting the data in the area corresponding to the object to be deleted using a neural network comprises:

preparing a second neural network learned to fill color data for an area corresponding to the at least one hole based on an original training image and a hole creation training image, the hole creation training image made by creating at least one hole corresponding to the object to be deleted at a random location of the original training image; and performing the hole-filling to fill the hole area with color data using the second neural network.

4. The method according to claim 3, wherein the original training image and the hole creation training image are panoramic image data including 360-degree image.

5. The method according to claim 4, wherein the second neural network is learned based on a loss between a spherically transformed original training image and a spherically transformed hole-filling image wherein the spherically transformed original training image is created by spherically transformed the original training image, and the spherically transformed hole-filling image is created by spherically transformed the hole-filling image created by second neural network performing hole-filling image on the original training image.

6. A computing device comprising a memory for storing one or more instructions and at least one processor for executing the one or more instructions stored in the memory, wherein the one or more instructions cause, when executed by the at least one processor, the at least one processor to:

prepare a plurality of data sets, each of which is created from a plurality of photographing points in an indoor space and includes image data;

determine whether an object to be deleted exists in the image data; if the object to be deleted exists in the image data, delete data in an area corresponding to the object to be deleted from the image data; and fill a hole area created by deleting the data in the area corresponding to the object to be deleted using a neural network, wherein the image data is panoramic image data including 360-degree image for any one of the plurality of photographing points, wherein in determining whether an object to be deleted exists in the image data, the processor is configured to:

detect at least one object existing in the image data using a first neural network that identifies an object; and identify whether the at least one object is the object to be deleted, and wherein in detecting at least one object existing in the image data using the first neural network, the processor is configured to:

create at least one planar transformed image data by planar transforming a panoramic image data; and detect at least one object existing in the at least one planar transformed image data using the first neural network learned based on the at least one planar transformed image data.

7. The computing device according to claim 6, wherein the first neural network is learned using color panoramic images as a training data, and identifies an object based on a panoramic image itself.

8. The computing device according to claim 6, wherein in filling a hole area created by deleting the data in the area corresponding to the object to be deleted using neural network, the processor is configured to:

prepare a second neural network learned to fill color data for an area corresponding to the at least one hole based on an original training image and a hole creation training image, the hole creation training image made by creating at least one hole corresponding to the object to be deleted at a random location of the original training image; and perform the hole-filling to fill the hole area with color data using the second neural network.

9. The computing device according to claim 8, wherein the original training image and the hole creation training image are panoramic image data including 360-degree image.

10. The computing device according to claim 9, wherein the second neural network is learned based on a loss between a spherically transformed original training image and a spherically transformed hole-filling image wherein the spherically transformed original training image is created by spherically transformed the original training image, and the spherically transformed hole-filling image is created by spherically transformed the hole-filling image created by second neural network performing hole-filling on the original training image.

11. A non-transitory storage medium for storing computer-readable instructions, wherein the instructions, when executed by a computing device, cause the computing device to perform the operations of:

determining whether an object to be deleted exists in the image data;

if the object to be deleted exists in the image data, deleting data in an area corresponding to the object to be deleted from the image data; and filling a hole area created by deleting the data in the area corresponding to the object to be deleted using a neural network, wherein the image data is panoramic image data including 360-degree image for any one of the plurality of photographing points, wherein the determining whether an object to be deleted exists in the image data comprises:

detecting at least one object existing in the image data using a first neural network that identifies an object; and identifying whether the at least one object is the object to be deleted, and wherein the detecting at least one object existing in the image data using the first neural network comprises:

creating at least one planar transformed image data by planar transforming a panoramic image data; and detecting at least one object existing in the at least one planar transformed image data using the first neural network learned based on the at least one planar transformed image data.

* * * * *